US012235726B2

(12) United States Patent
Fleiner et al.

(10) Patent No.: US 12,235,726 B2
(45) Date of Patent: Feb. 25, 2025

(54) IMPLEMENTING STATE CHANGE IN A HIERARCHY OF RESOURCES IN AN SDDC

(71) Applicant: VMware LLC, Palo Alto, CA (US)

(72) Inventors: Claudio Fleiner, San Jose, CA (US); Marc Fleischmann, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 114 days.

(21) Appl. No.: 17/578,928

(22) Filed: Jan. 19, 2022

(65) Prior Publication Data

US 2023/0104804 A1  Apr. 6, 2023

Related U.S. Application Data

(60) Provisional application No. 63/251,673, filed on Oct. 3, 2021.

(51) Int. Cl.
| | |
|---|---|
| *G06F 15/16* | (2006.01) |
| *G06F 9/50* | (2006.01) |
| *G06F 11/07* | (2006.01) |
| *G06F 11/14* | (2006.01) |
| *H04L 41/0893* | (2022.01) |
| *H04L 67/10* | (2022.01) |
| *H04L 67/1087* | (2022.01) |

(52) U.S. Cl.
CPC .......... *G06F 11/1423* (2013.01); *G06F 9/505* (2013.01); *G06F 9/5072* (2013.01); *G06F 9/5077* (2013.01); *G06F 11/0784* (2013.01); *H04L 41/0893* (2013.01); *H04L 67/10* (2013.01); *H04L 67/1089* (2013.01); *G06F 2209/505* (2013.01); *G06F 2209/508* (2013.01)

(58) Field of Classification Search
CPC ............. G06F 9/5077; G06F 2209/505; H04L 41/0893
See application file for complete search history.

(56) References Cited

U.S. PATENT DOCUMENTS

| | | | |
|---|---|---|---|
| 8,060,883 | B1 | 11/2011 | Rao et al. |
| 8,806,490 | B1 * | 8/2014 | Pulsipher ............... G06Q 10/10 718/100 |
| 10,348,758 | B1 | 7/2019 | Holl et al. |
| 11,316,951 | B2 | 4/2022 | Cooney et al. |

(Continued)

OTHER PUBLICATIONS

Non-Published Commonly Owned Related U.S. Appl. No. 17/578,920 with similar specification, filed Jan. 19, 2022, 41 pages, VMware, Inc.

(Continued)

*Primary Examiner* — Padma Mundur
(74) *Attorney, Agent, or Firm* — Quarles & Brady LLP

(57) ABSTRACT

Some embodiments provide a hierarchical data service (HDS) that manages many resource clusters that are in a resource cluster hierarchy. In some embodiments, each resource cluster has its own cluster manager, and the cluster managers are in a cluster manager hierarchy that mimics the hierarchy of the resource clusters. In some embodiments, both the resource cluster hierarchy and the cluster manager hierarchy are tree structures, e.g., a directed acyclic graph (DAG) structure that has one root node with multiple other nodes in a hierarchy, with each other node having only one parent node and one or more possible child nodes.

20 Claims, 12 Drawing Sheets

(56) References Cited

U.S. PATENT DOCUMENTS

| | | |
|---|---|---|
| 2017/0207977 A1 | 7/2017 | Soni et al. |
| 2017/0250877 A1* | 8/2017 | Seyvet ................ H04L 41/5003 |
| 2019/0384645 A1* | 12/2019 | Palavalli ............... H04L 63/101 |
| 2020/0065080 A1 | 2/2020 | Myneni et al. |
| 2021/0136121 A1 | 5/2021 | Crabtree et al. |

OTHER PUBLICATIONS

Non-Published Commonly Owned Related U.S. Appl. No. 17/578,923 with similar specification, filed Jan. 19, 2022, 41 pages, VMware, Inc.

Non-Published Commonly Owned Related U.S. Appl. No. 17/578,924 with similar specification, filed Jan. 19, 2022, 42 pages, VMware, Inc.

Non-Published Commonly Owned Related U.S. Appl. No. 17/578,931 with similar specification, filed Jan. 19, 2022, 42 pages, VMware, Inc.

Non-Published Commonly Owned Related U.S. Appl. No. 17/578,934 with similar specification, filed Jan. 19, 2022, 41 pages, VMware, Inc.

* cited by examiner

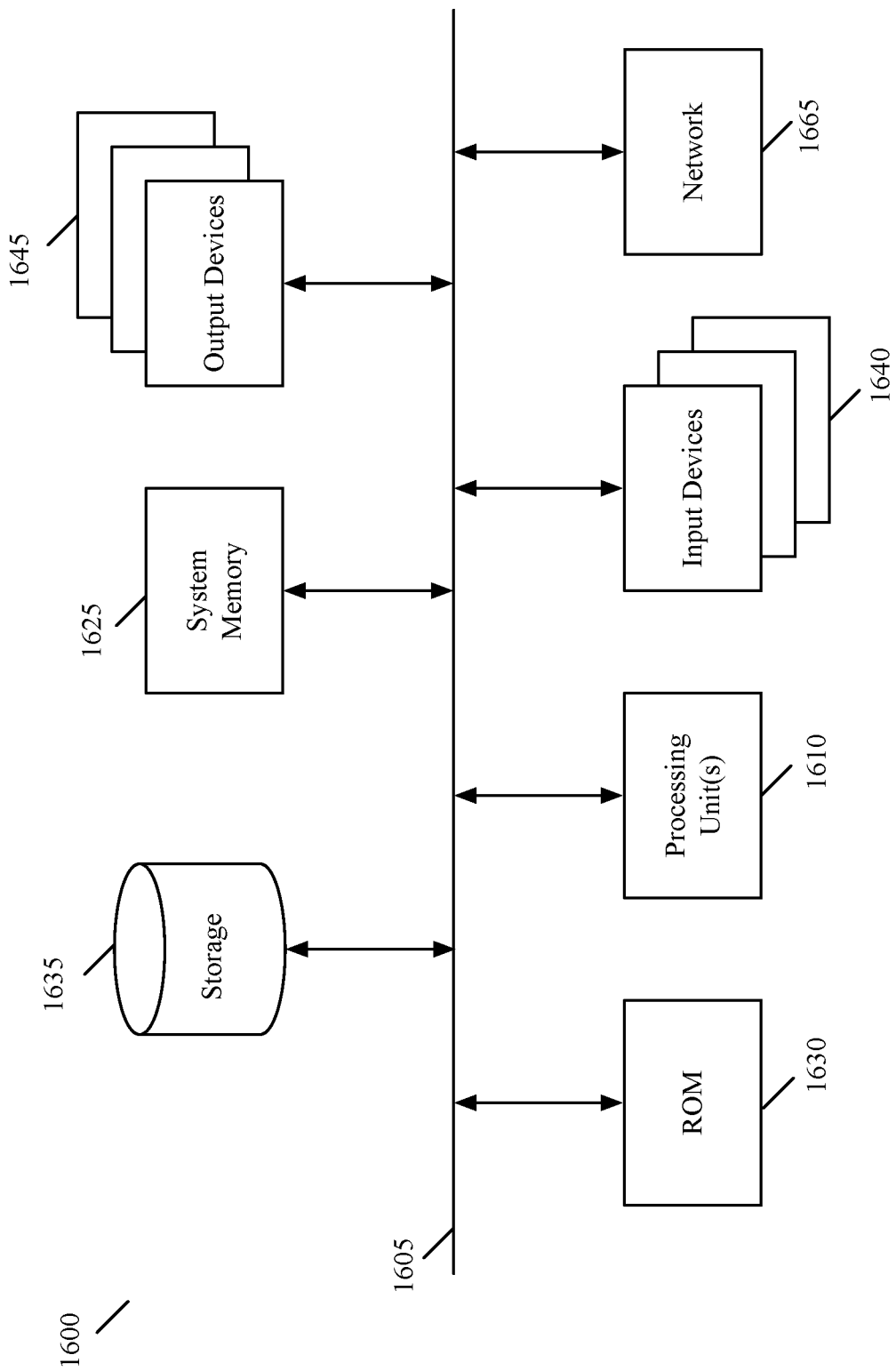

IMPLEMENTING STATE CHANGE IN A HIERARCHY OF RESOURCES IN AN SDDC

BACKGROUND

In recent years, systems that manage software defined datacenters (SDDC) have provided greater controls for managing a larger number of resources in the datacenters. These systems allow compute, network, and service resources to be managed often through a single user interface. Moreover, the complexity of managing the SDDC resources has increased with the advent of multi-cloud operations, as more resources now have to be controlled across multiple clouds, which may be different from one another.

BRIEF SUMMARY

Some embodiments provide a hierarchical data service (HDS) that manages many resource clusters that are in a resource cluster hierarchy. In some embodiments, the HDS is a multi-cloud data service (MCDS) that manages several resource clusters in two or more public or private clouds. The resources in some of these embodiments include compute resources such as datacenters, host computers, machines (e.g., virtual machines, Pods, containers, etc. executing on host computers), standalone servers, processors of host computers, processor cores of processors, graphical processing units, co-processors, memories of host computers and/or storages. Conjunctively, or alternatively, the resources include network elements such as gateways, routers, switches, middlebox service machines and appliances, etc.

In some embodiments, each resource cluster has its own cluster manager, and the cluster managers are in a cluster manager hierarchy that mimics the hierarchy of the resource clusters. In some embodiments, both the resource cluster hierarchy and the cluster manager hierarchy are tree structures, e.g., a directed acyclic graph (DAG) structure that has one root node with multiple other nodes in a hierarchy, with each other node having only one parent node and one or more possible child nodes. As further described below, other embodiments use other hierarchical structures, e.g., ones allowing a child cluster manager to have multiple parent cluster managers.

Each cluster manager (CM) in some embodiments connects to an upstream cluster manager to send state up to ancestor clusters (e.g., parent clusters, grandparent clusters, great grandparent clusters, etc.) and to receive desired state (e.g., instructions) from ancestor clusters. This architecture is very flexible and scalable in that it allows more resource clusters and cluster managers to be added horizontally or vertically.

In order to ensure that the management hierarchy does not get overwhelmed with updates from progeny clusters (e.g., child clusters, grandchild clusters, great grandchild clusters, etc.), some embodiments employ novel processes for ancestor clusters to receive states from progeny clusters. These embodiments also employ novel processes for distributing desired state requests from ancestor clusters to progeny clusters. Some embodiments further employ novel high availability (HA) architectures to ensure that the hierarchical management system does not completely fail when one or more cluster managers fail. These processes and architectures allow the cluster management hierarchy (and in turn the resource cluster hierarchy) to scale very easily, and have reasonable failure semantics.

More specifically, scalability requires the management hierarchy to impose some limits on the amount of data sent to the upstream cluster managers, and on the data coming down to make changes to the desired state. The management hierarchy in some embodiments limits the information sent in upstream by specifying how many levels a cluster sends up exact information. For the levels that are past a maximum upstream propagation level L from a particular cluster's level, the management hierarchy only sends up a summary, e.g., enough to allow the upper levels to manage some aspects of the no longer visible clusters, but limited so as not to overwhelm the system. This results in any cluster having only a clear view of a few layers, and some data about the rest of the system that is hidden. Like a fractal system, the management hierarchy of some embodiments allows an administrator to zoom in to any cluster, see a few levels, and then zoom into one of those to see more information. To support this zoom-in feature, the hierarchical managers at the top level (e.g., at the root node) or at each of the lower levels can direct lower level managers to provide additional information on a need basis.

In some embodiments, all the cluster have the same maximum upstream propagation level L, while in other embodiments the maximum upstream propagation level L can be defined for each cluster independently of other clusters. In still other embodiments, all clusters at the same level of the cluster hierarchy have the same maximum upstream propagation level L.

In order to limit the amount of data sent up, the management hierarchy in some embodiments sums up the data from the cluster managers below level L, adds those values to the cluster manager at level L, and then reports the aggregated data upstream. For example, if cluster manager X is at level L and has 10 cluster managers reporting to it, each of which is responsible for clusters with 12 servers with 24 cores each, the cluster manager X in some embodiments adds 120 servers and 2880 cores to the data of the cluster managed by the cluster manager X before reporting cluster X's value upstream to its parent manager (i.e., the manager of the cluster manager X). In essence, the management hierarchy treats the cluster managed by the cluster manager X as if it contains all the clusters reporting to it.

While the above-described approach solves the amount of data sent up, there is still a risk that too many updates need to be sent upstream, as in this example adding any server to any of the 10 clusters requires an update. The management hierarchy in some embodiments addresses this issue by requiring cluster managers to report only changes to the upstream cluster's manager when the data change is significant (e.g., greater than a threshold value). For example, the management hierarchy in some embodiments specifies that a data update is only sent up when the data has changed by more than 1% from the last time that it was reported. For the above-described example, the management hierarchy would only send an update to the number of cores when at least 29 cores have been added or removed from the clusters reporting to cluster X.

A change in desired state can be sent down easily to all cluster managers that are visible from an ancestor cluster manager (e.g., from the top cluster manager). However, given that not all progeny cluster managers are visible to an ancestor cluster manager (e.g., to the top cluster manager), the management hierarchy of some embodiments uses novel processes to manage top-down desired state distribution in a scalable manner. For instance, in some embodiments, desired state can be further distributed with uniform commands to all the progeny cluster managers in the hierarchy, e.g., with commands such as "upgrade all Object Stores to Version 3" or "make sure any object store has at least 30% free capacity," which might prompt some lower-level manager to move objects across various clusters to balance the system.

Also, some embodiments employ requests with criteria that allow the progeny cluster managers to make decisions as to how to implement the requests. For instance, in some embodiments, an ancestor cluster manager can send a request to all its progeny cluster managers to find an optimal placement for a single instance of a resource, e.g., "find a cluster that has 5PB free storage, and 40 servers with GPU." For such a request, each progeny cluster manager sends the request to any cluster manager downstream such that any downstream cluster manager that has enough space report up with a number that defines how "good" that request would fit and possibly how much these resources would cost.

Each cluster manager that gets such a report from a downstream cluster manager discards the report of the downstream cluster manager when it already has a better one. On the other hand, each particular progeny cluster manager sends up a report from a downstream cluster manager when the report is better than the particular progeny cluster manager's own report (if any) and other reports provided by downstream cluster managers of the particular progeny cluster manager. The top cluster manager in some embodiments accepts the placement identified in the first report that it receives, or the best report that it receives after a certain duration of time, or the best report that it receives after receiving responses from all of its direct child cluster managers (i.e., all the direct child cluster managers of the top cluster manager).

In some embodiments, cluster managers that get the state change need to decide how to translate it for cluster managers reporting in. Consider the following example of a desired state change: "start as few as possible database servers of type X to collect detailed stats for all clusters." This desired state change is then delegated from an ancestor cluster manager (e.g., the root node cluster manager) down to all its progeny cluster managers in order to delegate the "placement decision making" down from the root cluster manage to its downstream cluster managers.

The management hierarchy of some embodiments works well with policies and templates that can be pushed down to ensure that all cluster managers have a uniform list of policies, or by pushing them up so that the top cluster manager knows which policies are supported by the downstream cluster managers.

When cluster managers are in a DAG structure, and a particular cluster manager fails or a connection between the particular cluster manager and its child manager fails, its ancestor cluster managers no longer have visibility into the progeny cluster managers of the particular cluster manager. To address such cluster manager failures (to create a high availability management hierarchy), different embodiments employ different techniques. For instance, in some embodiments, each cluster manager has a list of possible upstream cluster managers so that when the cluster manager's parent CM fails the cluster manager can identify another upstream cluster manager on the list and connect to the identified upstream manager as its new parent cluster manager. In order to keep all data correct, some of these embodiments require that any cluster that loses contact with a downstream cluster immediately remove the data it reports up in order to avoid the data from getting reported twice to upstream cluster managers.

Other embodiments allow a cluster manager to connect to more than one upstream cluster manager and split the resources in some way between those cluster managers. For instance, each cluster manager reports its data to about X % (e.g., 25%) to each of N (e.g., 100/X) upstream cluster managers. If one upstream CM fails or the connection between this CM and its child CM fails, only a fraction of the resources will be temporarily invisible to the upstream cluster managers. This HA approach is combined with the above-described HA approach in some embodiments to allow a child CM to connect to another parent CM when its prior parent CM, or the connection to its prior parent CM, fails.

Some embodiments also employ novel processes to avoid loops in the management hierarchy. When any cluster manager connects to an upstream cluster manager that in turn, possibly over several connections, connects to itself, a loop is formed in the management hierarchy. Some or all of the cluster managers in the hierarchy in some embodiments are configured to detect such loops by detecting that the data that they collect increases without bounds.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

FIG. 16 conceptually illustrates a computer system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a hierarchical data service (HDS) that manages many resource clusters that are in a resource cluster hierarchy. In some embodiments, each resource cluster has its own cluster manager (CM), and the cluster managers are in a cluster manager hierarchy that mimics the hierarchy of the resource clusters. In some embodiments, both the resource cluster hierarchy and the cluster manager hierarchy are tree structures, e.g., a directed acyclic graph (DAG) structure that has one root node with multiple other nodes in a hierarchy, with each other node having only one parent node and one or more possible child nodes.

Figure 1:
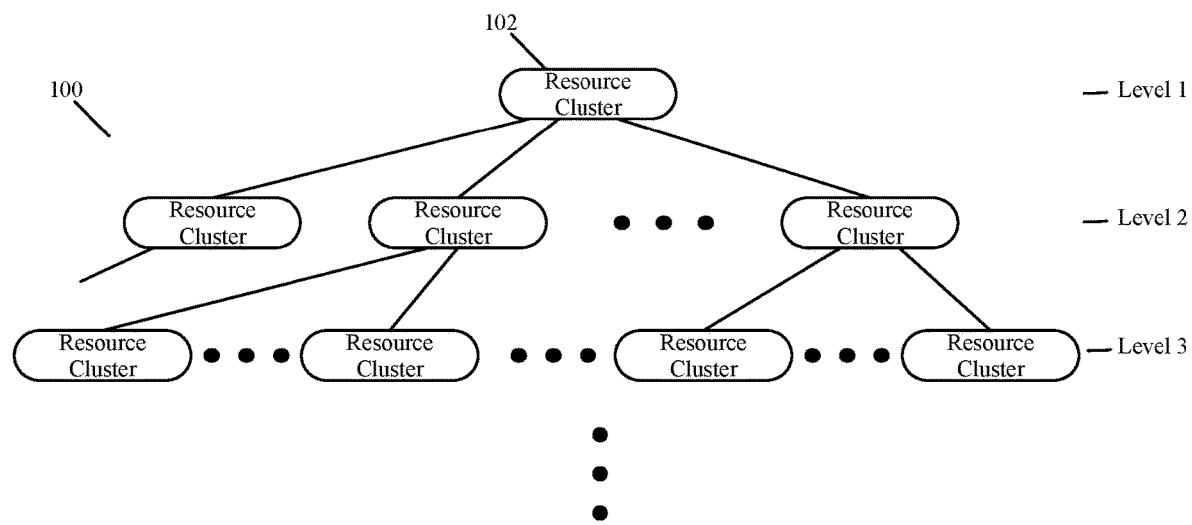
FIG. 1 conceptually illustrates a DAG being a hierarchy of resource clusters.
Figure 2:
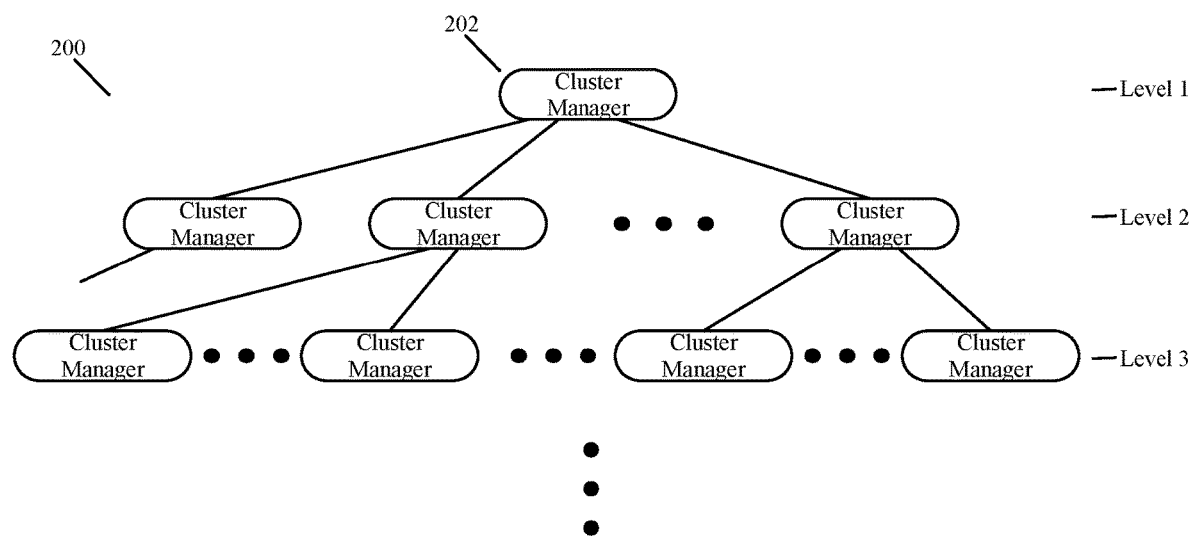
FIG. 2 conceptually illustrates a DAG a hierarchy of cluster managers for the resource clusters of the DAG illustrated in FIG. 1.

FIGS. 1 and 2 illustrate two DAGs 100 and 200, with the first DAG 100 being a hierarchy of resource clusters and the second DAG 200 being a hierarchy of cluster managers for the resource clusters of the first DAG 100. In some embodiments, the HDS is a multi-cloud data service (MCDS) that manages several resource clusters in two or more public or private clouds. The resources in some of these embodiments include compute resources such as datacenters, host computers, machines (e.g., virtual machines, Pods, containers, etc. executing on host computers), standalone servers, processors of host computers, processor cores of processors, graphical processing units, co-processors, memories of host computers and/or storages.

Conjunctively, or alternatively, the resources in some embodiments include network elements such as gateways, routers, switches, middlebox service machines and appliances, etc. In yet other embodiments, the resources include other elements in datacenters and computer networks. Also, some embodiments are used to manage just one type of resource (e.g., storage or compute) at multiple levels of hierarchy in one or more datacenters.

The DAG 100 includes multiple levels of resource clusters, while the DAG 200 includes multiple levels of cluster managers with each cluster manager corresponding to a resource cluster in the DAG 100. In FIGS. 1 and 2, three levels are explicitly illustrated but these DAGs can include many more levels, e.g., tens of levels, etc. Each DAG 100 or 200 has one root node 102 and 202, respectively, and multiple other nodes, with the root node having multiple child nodes and no parent node, and each other node in the DAG having only one parent node and one or more possible child nodes.

In DAG 200 of FIG. 2, each cluster manager is a group of one or more machines (VMs, Pods, containers, etc.) or standalone servers that manages a resource cluster in the DAG 100 of FIG. 1. Also, in DAG 200, each cluster manager at most has only one parent cluster manager and can have one or more child managers. In this structure, each cluster manager connects at most to one upstream cluster manager to send state up to ancestor cluster managers (e.g., parent cluster managers, grandparent cluster managers, great grandparent cluster managers, etc.) and to receive desired state (e.g., instructions) from ancestor cluster managers.

Also, in this structure, the root cluster manager 202 has no parent cluster manager, and connects to no upstream cluster managers. As further described below, other embodiments use other hierarchical structures, e.g., ones allowing a child cluster manager to have multiple parent cluster managers. In addition, other embodiments also have one cluster manager manage multiple resource clusters at the same or different levels of the resource cluster hierarchy 100.

The structure of the DAG 100 or 200 is very flexible and scalable in that it allows more resource clusters or cluster managers to be added horizontally or vertically, and therefore is an ideal approach to address the complexity problem of allowing users to manage arbitrarily large and diverse systems across many clouds and clusters. In order to ensure that the management hierarchy does not get overwhelmed with updates from progeny cluster managers (e.g., child cluster managers, grandchild cluster managers, great grandchild cluster managers, etc.), some embodiments employ novel processes for ancestor cluster managers to receive states from progeny cluster managers. These embodiments also employ novel processes for distributing desired state requests from ancestor clusters to progeny clusters. Some embodiments further employ novel high availability (HA) processes and/or architectures to ensure that the hierarchical management system does not completely fail when one or more cluster managers fail. These processes and architectures allow the cluster management hierarchy (and in turn the resource cluster hierarchy) to scale very easily, and have good failure semantics.

Scalability requires the management hierarchy to impose some limits on the amount of data sent to the upstream cluster managers, and on the data and/or instructions coming down to make changes to the desired state. The management hierarchy in some embodiments limits the information sent upstream by specifying how many levels a cluster manager sends up exact information. For the levels that are past a maximum upstream-propagation level L from a particular cluster manager's level, the management hierarchy only sends up a summary, e.g., enough to allow the upper levels to manage some aspects of the no longer visible clusters, but limited so as not to overwhelm the system. In some embodiments, all the cluster managers have the same maximum level L, while in other embodiments the maximum level L can be defined for each cluster manager independently of other cluster managers. In still other embodiments, all cluster managers at the same level of the cluster hierarchy have the same maximum level L.

In order to limit the amount of data sent up, the management hierarchy in some embodiments sums up the data from the cluster managers below level L, adds those values to the data produced by the cluster manager at level L, and then reports the aggregated data upstream. For example, if cluster manager X is at level L and has 10 cluster managers reporting to it, each of which is responsible for clusters with 12 servers with 24 cores each, the cluster manager X in some embodiments adds 120 servers and 2880 cores to the data of the cluster managed by the cluster manager X before reporting cluster X's value upstream to the parent manager of the cluster manager X. In essence, the management hierarchy treats the cluster managed by the cluster manager X as if it contains all the clusters of all of its child cluster managers.

Imposing maximum level(s) for propagating exact data upstream in the management hierarchy results in any cluster having only a clear view of a few layers, and some data about the rest of the system that is hidden. Like a fractal system, the management hierarchy of some embodiments allows an administrator to zoom in to any cluster, see a few levels, and then zoom into one of those to see more information. To support this zoom-in feature, the hierarchical managers at the top level (e.g., at the root cluster manager) or at each of the lower levels can direct lower level managers to provide additional information on a need basis.

While the above-described approach solves the amount of data sent up, there is still a risk that too many updates need to be sent upstream. For instance, in the above-described example, adding any server to any of the 10 clusters could require an update. The management hierarchy in some embodiments addresses this issue by requiring cluster managers to report only changes to the upstream cluster's manager when the data change is significant (e.g., greater than a threshold value). For example, the management hierarchy in some embodiments specifies that a data update is only sent up when the data has changed by more than 1% from the last time that it was reported.

Figure 3:
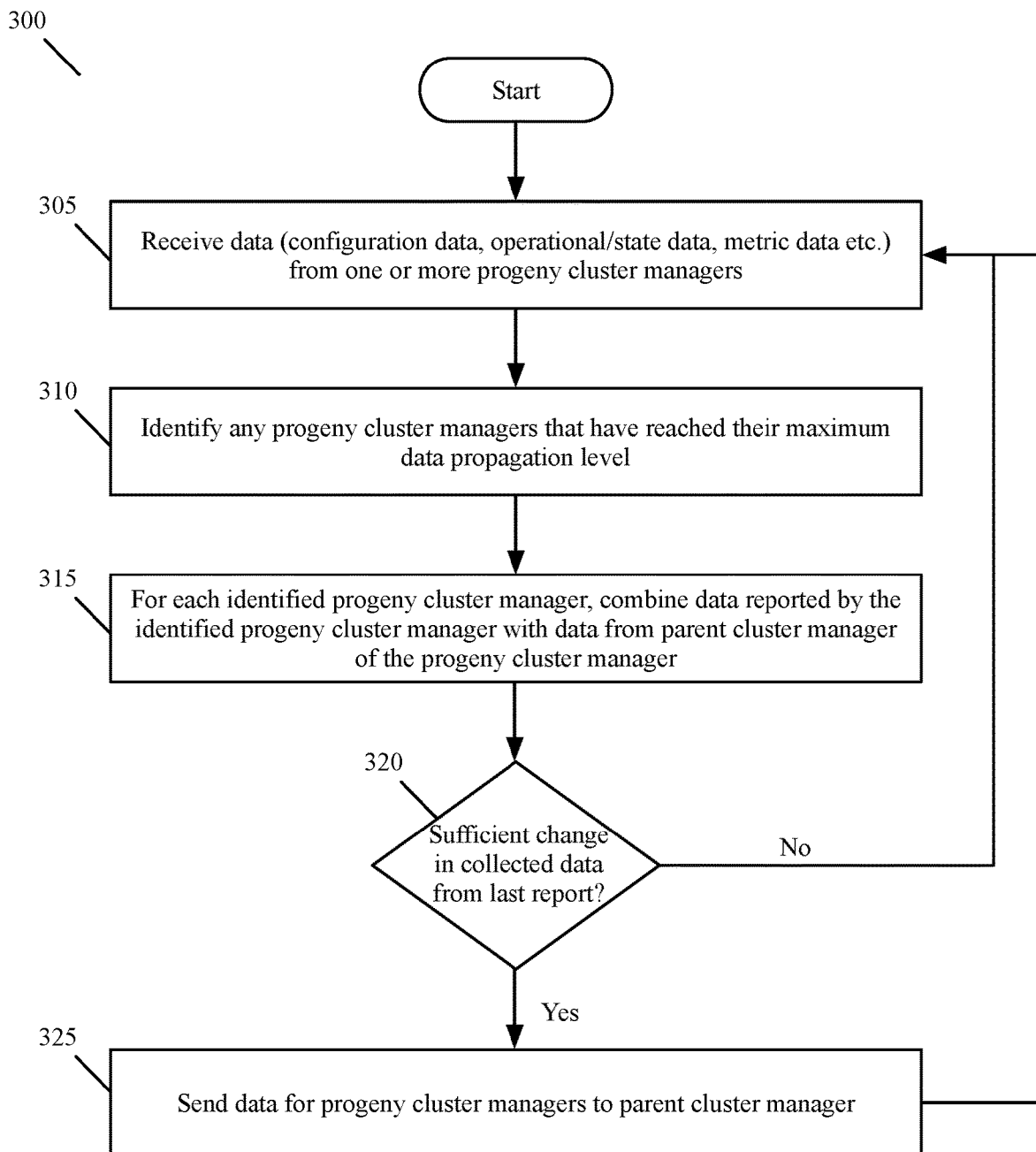
FIG. 3 illustrates a process performed by each particular cluster manager to aggregate the data that it receives from its progeny cluster managers and to forward this data to its parent cluster manager.

FIG. 3 illustrates a process 300 performed by each particular cluster manager to aggregate the data that it receives from its progeny cluster managers and to forward this data to its parent cluster manager. In some embodiments, the particular cluster manager performs the process 300 continuously to report up-to-date data from its progeny when there is sufficient amount of new data to report (e.g., amount of new data exceeds a threshold level).

As shown, the process 300 receives (at 305) data from one or more of its progeny cluster managers. In some embodiments, the received data can be any kind of data, such as configuration data, operational state data, metric data, etc. In some embodiments, each cluster manager receives data only from its child cluster managers, which, in turn receive data from their child cluster managers, and so on.

At 310, the process 300 identifies any of its progeny cluster managers that have reached their maximum upstream propagation level (MUPL). As mentioned above, all the cluster managers have the same maximum level L, while in other embodiments the maximum level L can be defined for each cluster manager independently of other cluster managers. In still other embodiments, all cluster managers at the same level of the cluster management hierarchy have the same maximum level L. Also, in some embodiments, the MUPL for a cluster can change over time, e.g., as more clusters are added, the MUPL for some or all of the clusters can be decreased in some embodiments in order to avoid data overflow.

Figure 4:
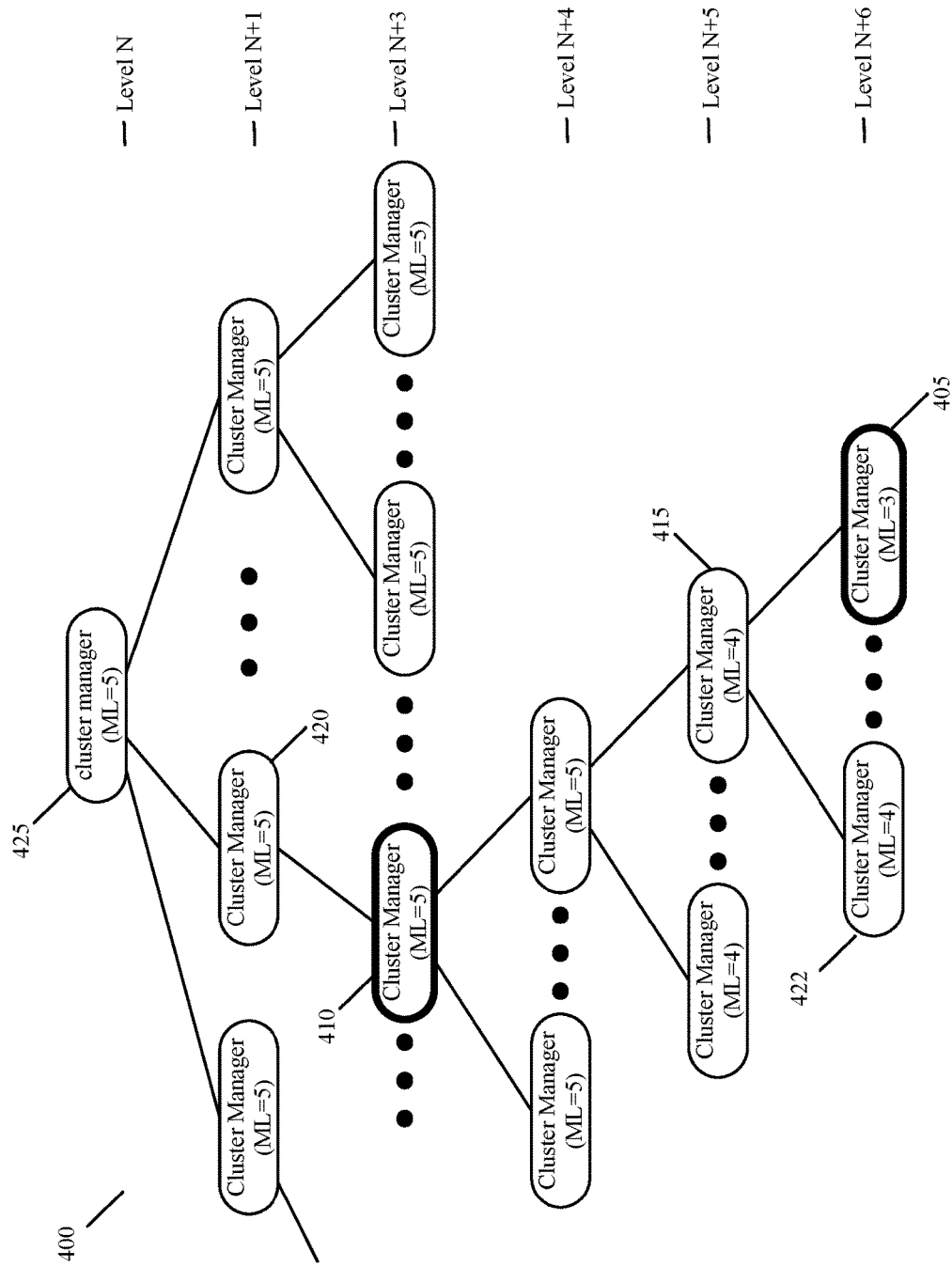
FIG. 4 illustrates an example in which different cluster managers can have different maximum levels even with cluster managers at the same level of the management hierarchy.

FIG. 4 illustrates an example in which different cluster managers can have different maximum levels even with cluster managers at the same level of the management hierarchy. Specifically, this figure illustrates a cluster manager hierarchy 400 that has most of the cluster manager with a maximum level 5, a few cluster managers with a maximum level 4, and one cluster manager 405 with an MUPL 3. In this example, cluster manager 405 is a great grandchild of the cluster manager 410. Accordingly, the cluster manager 410 identifies the cluster manager 405 as having reached its maximum upstream-propagation level (of 3) once its data has reached the cluster manager 405. As all of its progeny cluster managers have a maximum level of 4 or higher, the cluster manager 410 does not identify any other cluster manager as having reached its maximum upstream-propagation level.

For each progeny cluster manager identified at 310, the process 300 (at 315) combines the data reported by the identified progeny cluster manager with the data reported by the cluster manager that is the parent of the identified progeny cluster manager. For instance, in the example of FIG. 4, the cluster manager 410 combines the data reported by the cluster manager 405 with its parent cluster manager 415. The data from the cluster manager 415 does not need to be combined with the data of its other child cluster 422 because this child cluster 422 has not reached its maximum upstream-propagation level (of 4) when its data reaches the cluster manager 410.

As mentioned above, each cluster manager in some embodiments only reports data upstream when it has collected sufficient data since its last upstream data report (e.g., it has collected more than a threshold amount of new data since its last upstream data report). Hence, at 320, the process 300 determines whether it has collected sufficient amount of data since its last upstream report. In the above described example, when the management hierarchy in some embodiments specifies that a data update is only sent up when the data has changed by more than 1% from the last time that it was reported, the process 300 would only send an update to the number of cores when at least 29 cores have been added or removed from the clusters reporting to cluster X.

When the process 300 determines (at 320) that it has not collected sufficient amount of data since its last upstream report, the process returns to 305 to receive more data from its progeny cluster managers (e.g., from its child cluster managers). On the other hand, when the process 300 determines (at 320) that it has collected sufficient amount of data since its last upstream report, it sends (at 325) the new data that it has collected for its own resource cluster and the new data that it has collected from its progeny cluster managers to the parent cluster of the particular cluster manager that is executing process 300. After 325, the process 300 returns to 305 to receive additional data from the progeny cluster managers.

In sending its upstream report, the process 300 generates, for each identified progeny cluster manager that has reached its maximum upstream-propagation level, a combined report that combines the identified progeny cluster manager's data with its parent cluster manager. For instance, in the example illustrated in FIG. 4, the process 300 generates a combined report that combines the data reported by the cluster manager 405 with its parent cluster manager 415. In the example illustrated in FIG. 4, the cluster manager 410 does not combine the new data of any other progeny cluster managers as it does not identify any other progeny cluster managers that at the level of the cluster manager 410 has reached its maximum upstream-propagation level.

Different embodiments generate different types of combined reports. Some embodiments simply add the data of the identified progeny cluster managers that have reached their maximum upstream-propagation level to the data of their parent cluster managers (e.g., add the data of the cluster manager 405 to the data of its parent cluster manager 415) so that to the upstream cluster managers (i.e., to the ancestors cluster managers 420 and 425 of the cluster manager 410) the data appears to be the data of the parent cluster managers (i.e., of the parent cluster manager 415). In other embodiments, the process 300 reports the data of the parent cluster manager (e.g., manager 415) without the aggregation but appends to the parent cluster manager's data a separate data structure that summarizes the data of the progeny cluster manager(s) of the parent cluster manager (e.g., cluster manager 415).

When a parent cluster manager receives the state data that its child cluster manager sent at 325, the parent cluster manager performs its own process 300 immediately or periodically to pass along the received data to its parent (i.e., to the grandparent cluster manager of the child cluster manager) if the changes in the state data require its forwarding to its parent. In some cases, the parent cluster manager generates at least one additional aggregated datum from the received detailed data and/or the received aggregated datum before providing the data to the grandparent cluster manager. The reporting of one child cluster manager can trigger the operation of the process 300 by all ancestor parent clusters until updated state data reaches the root cluster manager. It should be noted that some embodiments do not perform the thresholding operation at 320, as the child cluster managers report all state changes upstream to their respective parent cluster managers.

Figure 5:
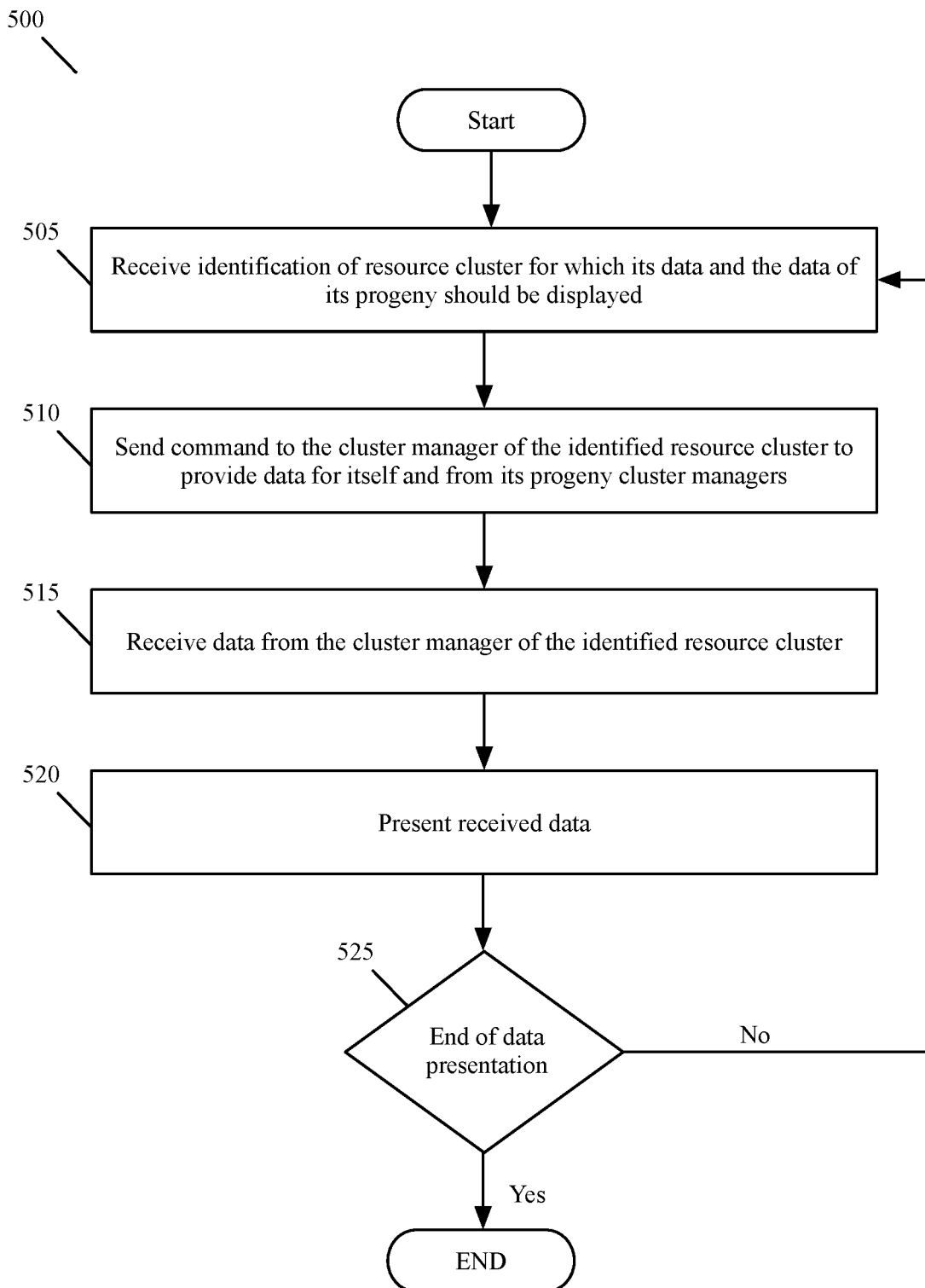
FIG. 5 illustrates a process for displaying data collected by the cluster managers.

FIG. 5 illustrates a process 500 for displaying data collected by the cluster managers. As described above, the use of maximum upstream-propagation level results in any cluster manager having (1) a clear view of a few levels of the resource hierarchy and (2) some data about the rest of the resource hierarchy that is hidden. Like a fractal system, the process 500 allows an administrator to zoom in to any cluster, see a few levels, and then zoom into one of those to see more information.

Through a user interface supported by a set of web servers, the administrator in some embodiments interacts with the root cluster manager (e.g., cluster manager 202) to use the zoom-in display feature provided by the process 500. In other embodiments, the administrators can directly access some or all cluster managers through their respective user interfaces that are supported by the same set or different sets of webservers. The process 500 is performed by the cluster manager with which the administrator interacts.

As shown, the process 500 starts when the cluster manager receives (at 505) identification of a set of resource clusters to examine. In some embodiments, the process 500 receives this identification as part of a zoom request that identifies one resource cluster as the resource cluster that should be the focus of the zoom operation. This identification in some embodiments is a request to review data regarding the resource cluster that is subject of the zoom operation along with the data of this resource cluster's progeny clusters.

Next, at 510, the process sends a command to the first ancestor cluster manager of all of the resource clusters identified at 505. In the embodiments where one particular cluster manager is identified at 505 as the resource cluster that is the focus of the zoom request, the process 500 sends (at 510) the command to the cluster manager of the identified resource cluster for the zoom request. The command directs the addressed cluster manager to provide data for its resource cluster and data from its progeny cluster managers for the resource clusters that they manage. For the progeny resource clusters that have reached their maximum level (at the level of the addressed cluster manager), their data is aggregated with the date of their parent resource clusters because of the maximum upstream-propagation level criteria.

The process 500 receives (at 515) the requested data from the cluster manager to which it has sent its request at 510. At 520, the process generates a report that illustrates the data collected from the cluster manager, and presents through the user interface this generated report to the administrator. This report is a report that the administrator can explore and navigate through traditional UI controls (e.g., drop down menus, pop-up windows, etc.) to see various presentations and details of the received requested data.

If the administrator ends (at 525) his exploration of the data collected by the cluster manager hierarchy, the process 500 ends. Otherwise, when the administrator continues his exploration of the resource cluster hierarchy, the process returns to 505, where it receives identification of another set of resource clusters (e.g., it receives another resource cluster to zoom into in order to view its data and the data of its progeny), and then repeats the operations 510-525 for this set of resource clusters.

Figure 6:
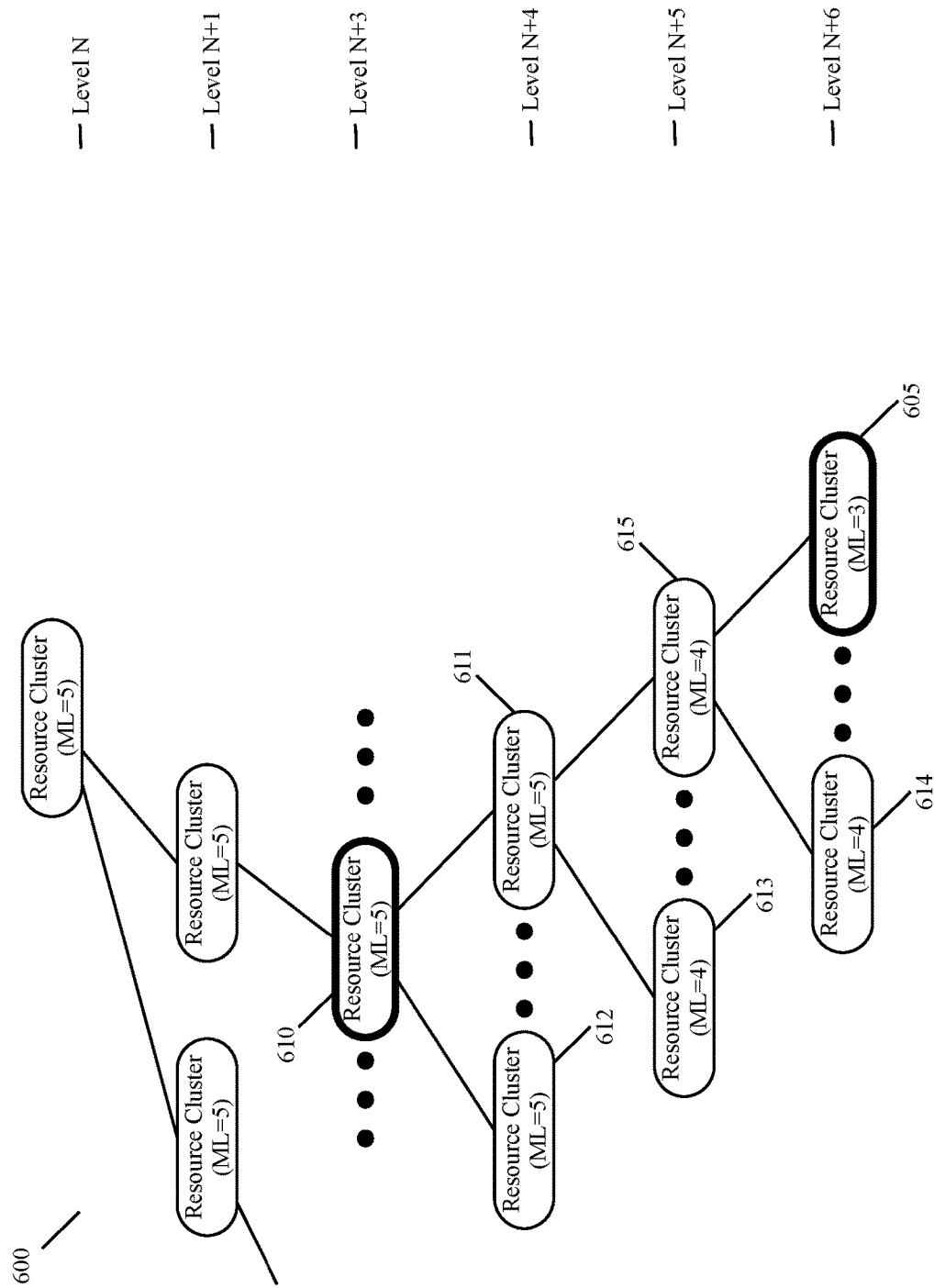
FIG. 6 illustrates the resource cluster hierarchy for the cluster manager hierarchy illustrated in FIG. 4.
Figure 7:
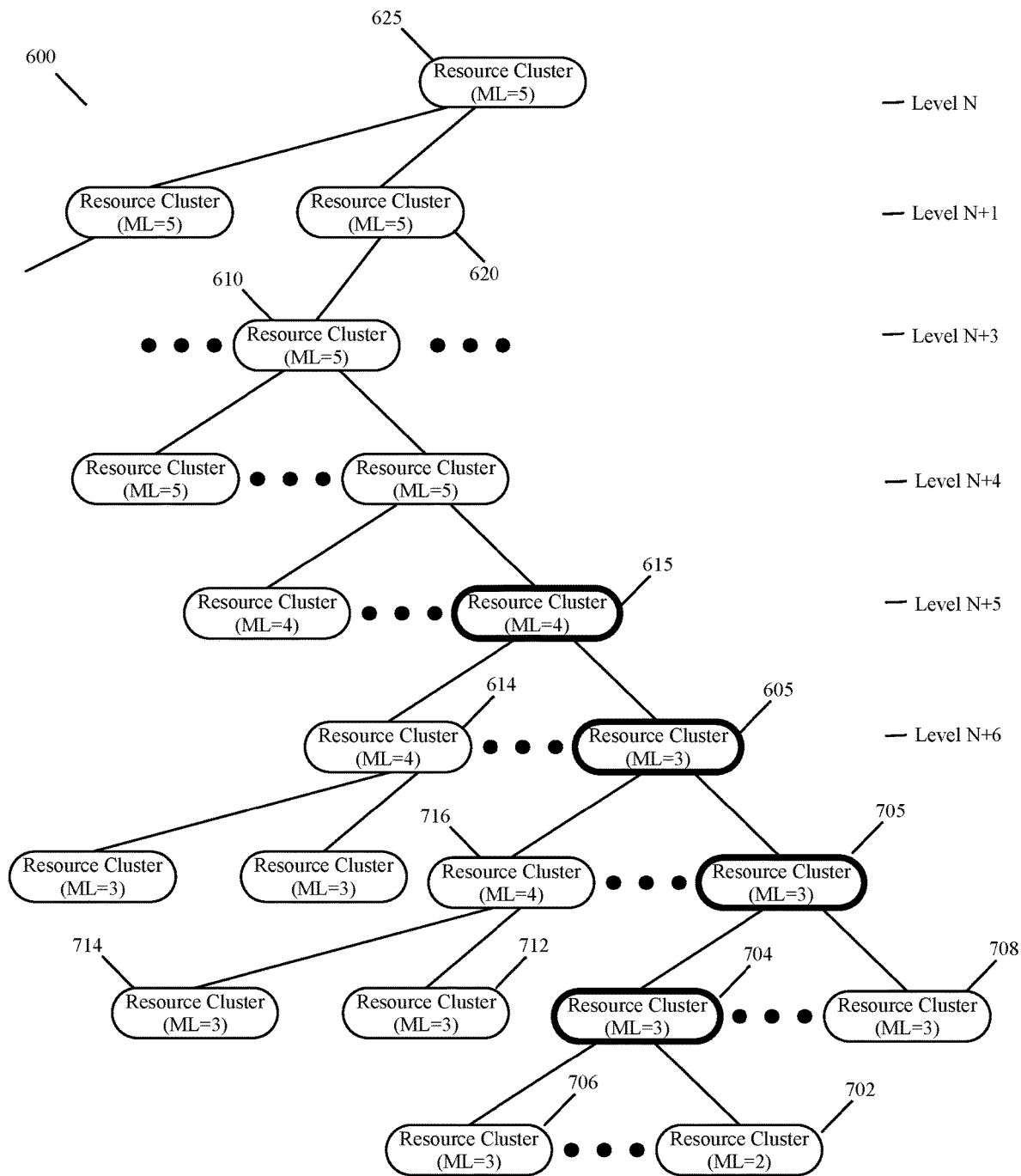
FIG. 7 illustrates the administrator performing a zoom-in operation on resource cluster after seeing the data collected in FIG. 6.

FIGS. 6 and 7 illustrate examples of using process 500 to explore the resource cluster hierarchy. FIG. 6 illustrates the resource cluster hierarchy for the cluster manager hierarchy illustrated in FIG. 4. In the example illustrated in FIG. 6, the administrator interacts with the root cluster manager to select resource cluster 610 as the resource cluster to zoom-in on. Based on this selection, the root cluster manager collects data from cluster manager 410 for its corresponding resource cluster 610, and for the progeny resource clusters of the resource cluster 610.

As shown in FIG. 6, most of the progeny resource clusters have MUPLs of 4 and 5, but the resource cluster 605 has a MUPL of 3. This means that the cluster manager 410 would return unaggregated, granular data for the resource cluster 610 and all of its progeny clusters 611-614, except for its progeny resource cluster 605 and 615. The cluster manager 410 of the resource cluster 610 aggregates the data for the resource cluster 605 with the data for its parent resource cluster 615, because at the level of the cluster manager 410 and its corresponding resource cluster 610, the resource cluster 605 has reached it maximum upstream-propagation level.

FIG. 7 illustrates that after seeing the data that was collected from the resource cluster 610 and its progeny clusters in FIG. 6, the administrator performs a zoom-in operation on resource cluster 615. Based on this selection, the root cluster manager collects data from cluster manager 415 for its corresponding resource cluster 615, and for the progeny resource clusters of the resource cluster 615. To collect the data from the cluster manager 415, the root cluster manager in some embodiments directly communicates with the cluster manager 415 in some embodiments. In other embodiments, the root cluster manager sends its request for additional data from the cluster manager 415 through the intervening cluster managers between the root cluster manager and the cluster manager 415. In these other embodiments, the cluster manager 415 would receive the zoom-in data request operation from its parent cluster manager, which in turn receives it from its parent, and so on.

As shown in FIG. 7, most of the progeny resource clusters of the resource cluster 605 have an MUPL of 3, one resource cluster 614 has an MUPL of 4, and one resource cluster has an MUPL of 2. Based on these MUPLs, the cluster manager of resource cluster 705 would aggregate the data of the resource cluster 702 with that of its parent resource cluster 704, and the cluster manager 405 of the resource cluster 605 would aggregate the data of the resource cluster 706 with that of its parent cluster 704.

Moreover, the cluster manager 415 would aggregate the data that it gets for resource cluster 704 (which includes the data for resource clusters 702 and 706) with the data from resource cluster 705 along with the data from the resource cluster 708. The cluster manager 415 would aggregate the data that it gets for resource cluster 712 and 714 with the data of their parent resource cluster 716, as both clusters 712 and 714 have an MUPL of 3, which has been reached at the level of the resource cluster 615 and the cluster manager 415.

A change in desired state can be sent down easily to all cluster managers that are visible from an ancestor cluster manager (e.g., from the top cluster manager). However, given that not all progeny cluster managers are visible to an ancestor cluster manager (e.g., to the top cluster manager), the management hierarchy of some embodiments uses novel processes to manage top-down desired state distribution in a scalable manner.

Figure 8:
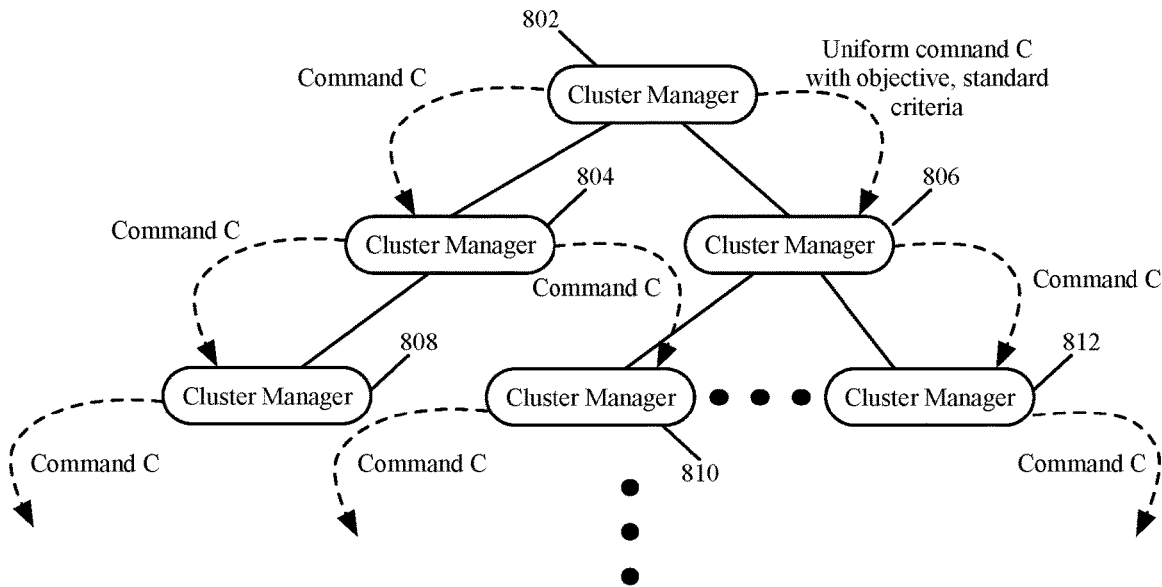
FIG. 8 illustrates a desired state distributed as a uniform command to all the progeny cluster managers in the hierarchy.

For instance, FIG. 8 illustrates that in some embodiments, desired state can be distributed as a uniform command to all the progeny cluster managers in the hierarchy, e.g., with commands such as "upgrade all Object Stores to Version 3" or "make sure any object store has at least 30% free capacity," which might prompt some lower-level manager to move objects across various clusters to balance the system. This uniform command is expressed with objective, standard criteria that can be deciphered by all cluster managers. As shown, the root cluster manager 802 sends this command to its child cluster managers 804 and 806, which in turn send this command to their child cluster managers 808, 810 and 812, and so on.

The approach illustrated in FIG. 8 works well in hierarchical management systems that distribute policies to all cluster managers so that they have a uniform list of policies. In some embodiments, each particular cluster manager for a particular resource cluster receiving a set of policies to implement state change from its parent cluster manager. The particular cluster manager in some embodiments distributes the received set of policies to its child cluster managers, which also distribute them to their progeny until all the cluster managers have received the same set of policies.

Subsequently, after receiving the set of policies, the particular cluster manager separately receives from its parent cluster manager a command and a set of policy-evaluating criteria. Like the received policies, the particular cluster manager in some embodiments distributes the received command and policy-evaluating criteria set to its child cluster managers, which also distribute them to their progeny until all the cluster managers have received the same command and policy-evaluating criteria set.

The command directs each cluster manager to implement a state change (e.g., perform security check) when the received set of policy-evaluating criteria (e.g., a particular threshold value for available CPU cycles) satisfies a group of the received policies (e.g., a policy that allows security checks when there are more than a threshold amount of CPU cycles). Each cluster manager determines whether the received set of policy-evaluating criteria satisfies a group of one or more received policies. If so, the cluster manager processes the command to implement the state change on the resource cluster that it manages. In some embodiments, the cluster manager sends a notification to the cluster manager that sent the command either directly, or through any intervening cluster managers in the cluster manager hierarchy.

Figure 9:
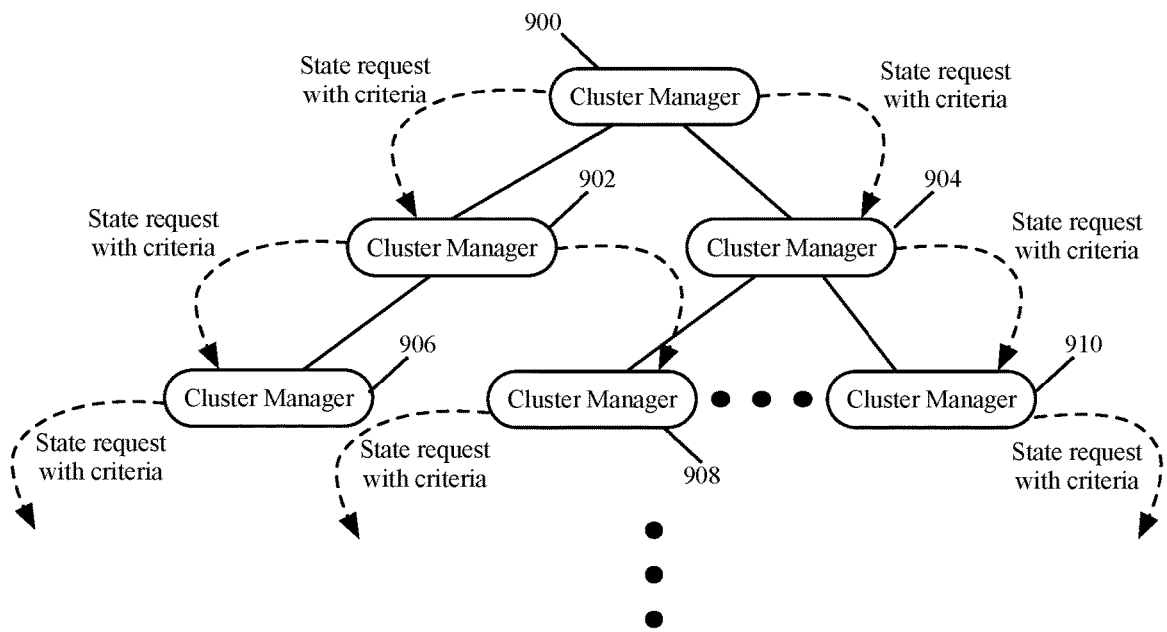
FIGS. 9-11 illustrates another way to distribute desired state.
Figure 10:
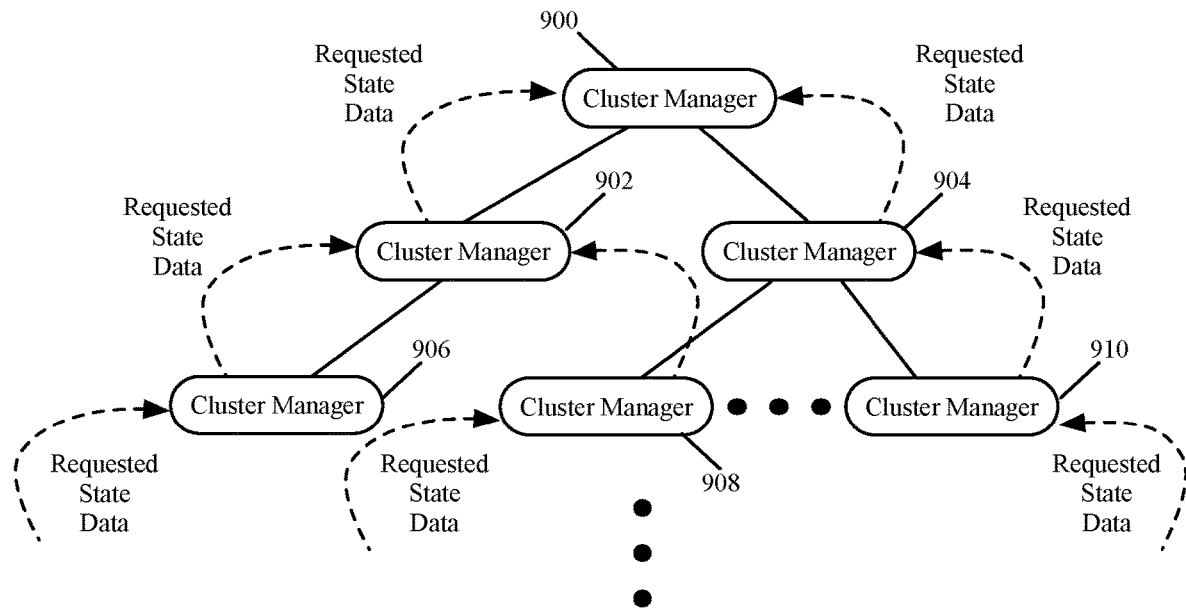
Figure 11:
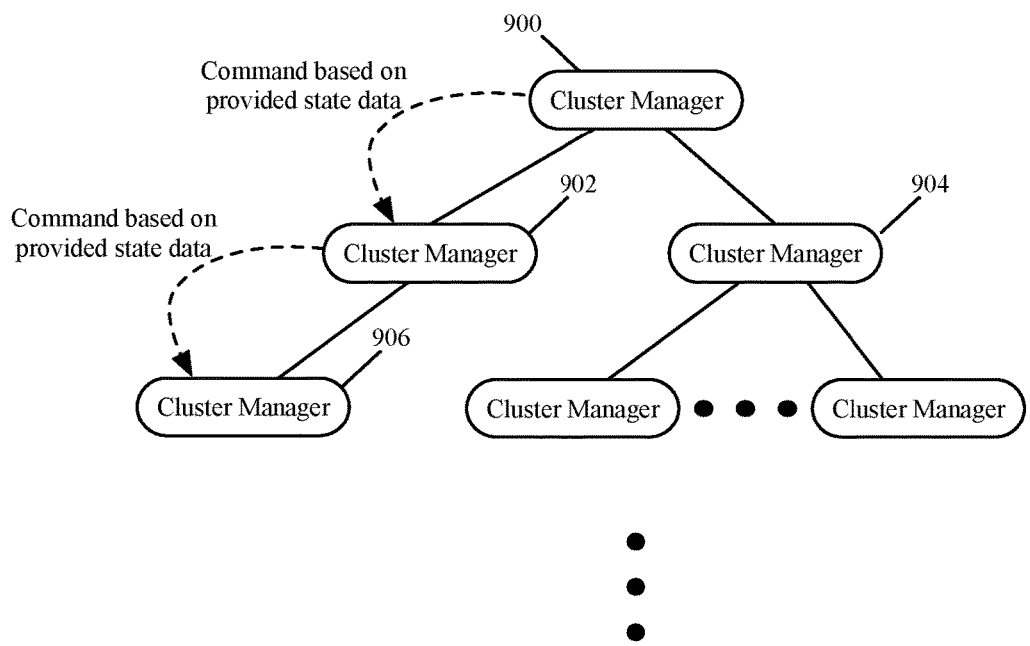

FIGS. 9-11 illustrates another way to distribute desired state. To distribute some desired state data, the root cluster manager 900 in some embodiments first has to collect some actual state data from its progeny clusters. Accordingly, as shown in FIG. 9, the root cluster manager 900 in some embodiments sends to its child cluster managers 902 and 904 a state request with criteria that allow the progeny cluster managers to collect state data to report back to the root cluster manager in order for it to be able to make a decision as to how to implement its desired state.

For instance, in some embodiments, a root cluster manager sends a request to all its child cluster managers to find an optimal placement for a single instance of a resource, e.g., "find a cluster that has 5PB free storage, and 40 servers with GPU." As shown in FIG. 9, each of the root child cluster managers sends the state request to its child cluster managers (e.g., 906, 908, 910), which in turn send it to their child cluster managers, and so on.

As shown in FIG. 10, each downstream cluster manager that can satisfy the criteria of the state request (e.g., can use the criteria as query or match attributes to identify state data to return), provides the requested state data to its parent cluster manager. For instance, in the above-described example, any cluster manager downstream that can find enough free space and appropriate number of servers with GPUs, sends an upstream report with a number that defines how "good" that request would fit in the free space available to it.

In some embodiments, each cluster manager that gets such a report from a downstream cluster manager discards the report of the downstream cluster manager when it already has a better solution (i.e., has a better identified state) for the request identified on its resource cluster or on a resource cluster of one of its progeny cluster managers. On the other hand, each particular progeny cluster manager sends up a report from a downstream cluster manager when the report is better than the particular progeny cluster manager's own report (if any) and other reports provided by downstream cluster managers of the particular progeny cluster manager. In some embodiments, each cluster manager sends upstream the N best solutions that it identifies, where N is an integer that is two or greater.

In some embodiments, each particular progeny cluster manager sends up its report after waiting a certain duration of time to receive input from its child cluster managers (e.g., after an expiration of a timer that it sets when it sent down the state data request to its child clusters). When the state request from a parent cluster manager provides a criteria (e.g., identify hosts that have more than 50% capacity), the child cluster manager in some embodiments reports to its parent cluster manager the first state data that it identifies from its own resource cluster or from a response from one of its progeny cluster managers.

The root cluster manager in some embodiments accepts the placement identified in the first report that it receives, or the best report that it receives after a certain duration of time, or the best report that it receives after receiving responses from all of its direct child cluster managers (i.e., all the direct child cluster managers of the top cluster manager). The root cluster manager 900 processes the requested state data that it receives, and identifies a particular desired state to distribute to one or more cluster managers.

FIG. 11 illustrates that based on the requested state data that it receives, the root cluster manager 900 identifies a particular desired state (e.g., a deployment of a Pod) that it needs the cluster manager 906 to implement in the resource cluster that it manages. Through its child cluster manager 902, the root cluster manager 900 sends a command (e.g., to deploy a Pod) for the cluster manager 906 to process in order to effectuate the desired state change the resource cluster managed by the cluster manager 906.

In other embodiments, the root cluster manager directly sends the command to the cluster manager 906. After receiving the command, the cluster manager 906 executes the command (e.g., deploys a Pod) in order to achieve the desired state in the resource cluster that it manages. Once the cluster manager 906 processes the command and achieves the desired state, the cluster manager 906 in some embodiments sends a notification of the state change to the requesting cluster manager (which in this case is the root cluster manager 900) directly, or through its intervening ancestor cluster manager(s) (which in this case is cluster manager 902).

In some embodiments, cluster managers that get the state change need to decide how to translate it for cluster managers reporting in. Consider the following example of a desired state change: "start as few as possible database servers of type X to collect detailed stats for all clusters." This desired state change is then delegated from an ancestor cluster manager (e.g., the root node cluster manager) down to all its progeny cluster managers in order to delegate the "placement decision making" from the root cluster manager down to downstream cluster managers in the cluster manager hierarchy.

The management hierarchy of some embodiments works well with policies and templates that can be pushed down to ensure that all cluster managers have a uniform list of policies, or by pushing them up so that the top cluster manager knows which policies are supported by the downstream cluster managers.

When cluster managers are in a DAG structure, and a particular cluster manager fails or a connection between the particular cluster manager and its child manager fails, its ancestor cluster managers no longer have visibility into the progeny cluster managers of the particular cluster manager. To address such cluster manager failures (to create a high availability management hierarchy), different embodiments employ different techniques.

For instance, in some embodiments, each cluster manager has a list of possible upstream parent cluster managers so that when the cluster manager's parent CM fails, the cluster manager can identify another upstream cluster manager on the list and connect to the identified upstream manager as its new parent cluster manager. In order to keep all data correct, some embodiments require that any cluster manager that loses contact with a downstream cluster immediately remove the data it reports up in order to avoid the data from getting reported twice to upstream cluster managers.

Figure 12:
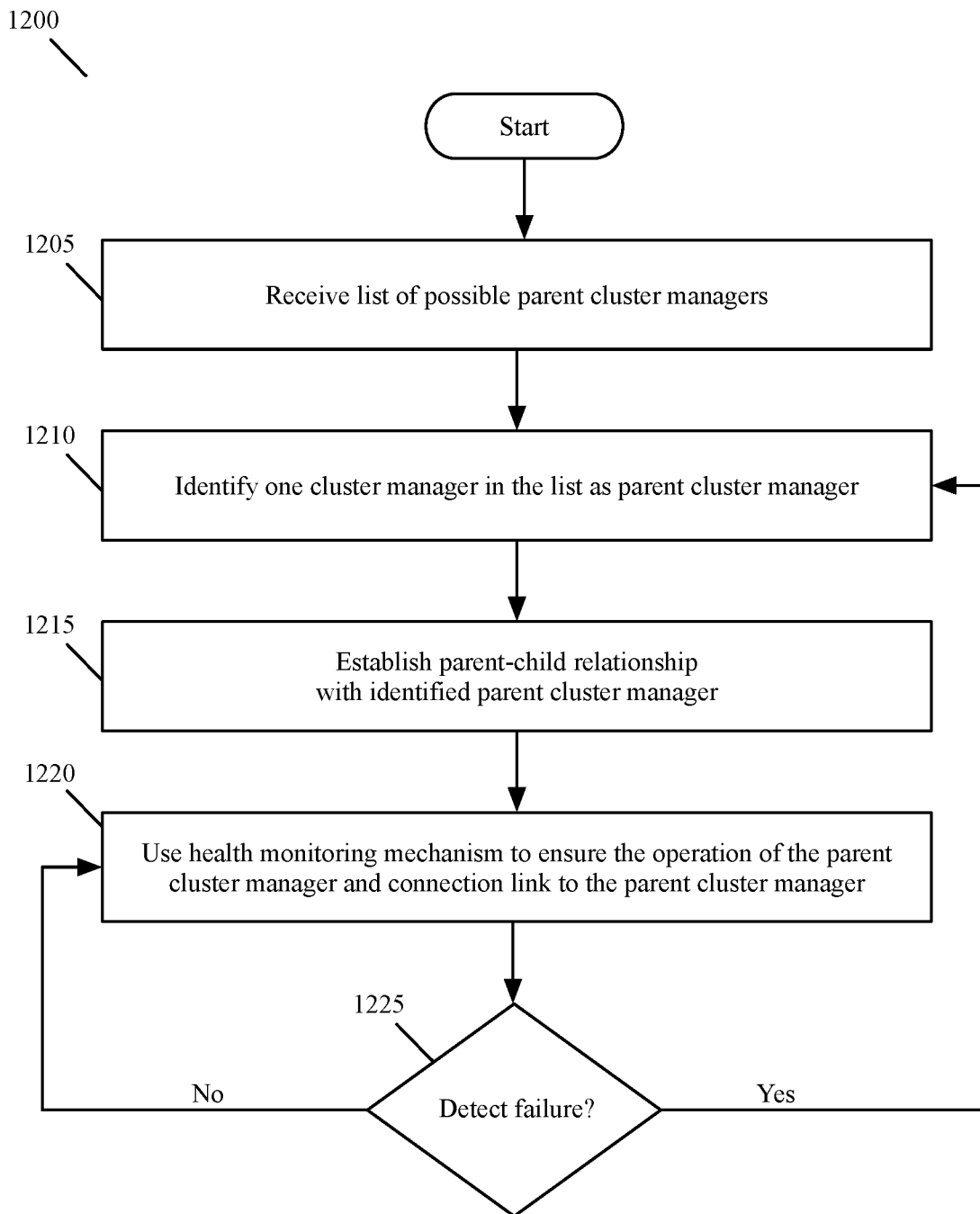
FIG. 12 illustrates a process that each non-root cluster manager performs in some embodiments to be connected at all times to one parent cluster manager.

FIG. 12 illustrates a process 1200 that each non-root cluster manager performs in some embodiments to be connected at all times to one parent cluster manager. As shown, the process 1200 initially receives (at 1205) a list of possible parent CMs. Next, at 1210, the process 1200 identifies one cluster manager in the list as its parent cluster manager. In some embodiments, the received list identifies an initial parent cluster manager and/or an order for the process 1200 to use to select successive parent cluster managers. In other embodiments, the process 1200 selects a parent cluster manager based on some heuristics.

At 1215, the process 1200 establishes a parent-child relationship with the parent cluster manager identified at 1210. In some embodiments, the process establishes this relationship by communicating with the identified cluster manager to register with it as one of its child cluster managers. This registration in some embodiments establishes between the two cluster managers a tunnel for the two cluster managers to use for the communications (e.g., to exchange packets to pass desired state downstream and actual state upstream). In other embodiments, two clusters communicate through other mechanisms, e.g., through VPN (virtual private network) connections, Ethernet, Internet, etc.

After this registration, the process 1200 in some embodiments starts (at 1220) monitoring the health of the parent cluster manager and the connection link to the parent cluster manager. The health monitoring in some embodiments involves exchanging keep alive messages with the parent cluster manager. At 1225, the process determines whether it has detected failure of the parent cluster manager or the connection link to the parent cluster manager. If not, the process returns to 1220 to continue monitoring health of the parent cluster manager and the connection link to the parent cluster manager. When the process detects failure of the parent cluster manager or the connection link to the parent cluster manager, it returns to 1210 to identify another cluster manager in the list of candidate cluster managers.

Figure 13:
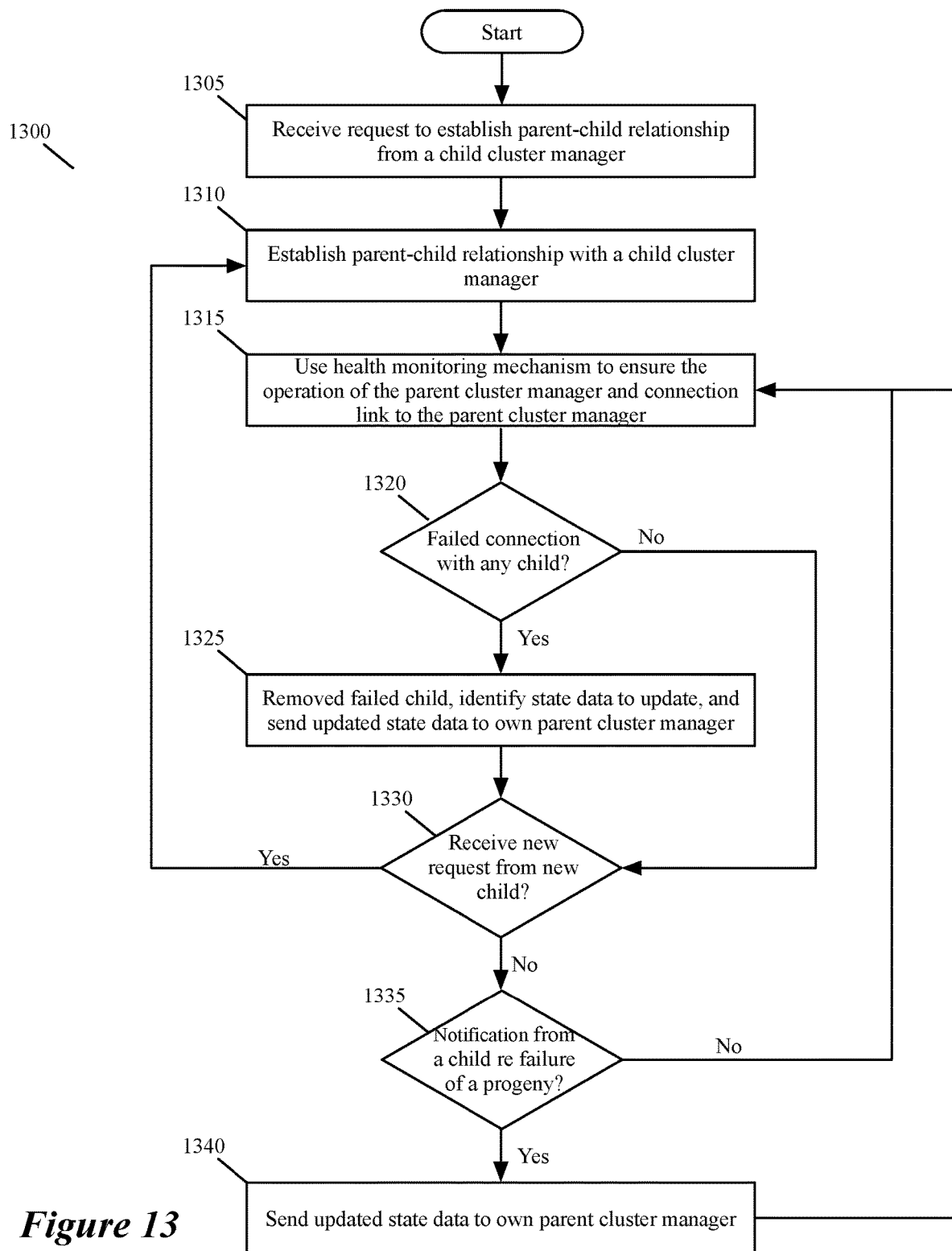
FIG. 13 illustrates a process that a parent cluster manager performs in some embodiments to manage relationship with its child cluster managers.

FIG. 13 illustrates a process 1300 that a parent cluster manager performs in some embodiments to manage relationship with its child cluster managers. As shown, the process starts (at 1305) when the parent cluster manager receives a request from a cluster manager to establish parent-child relationship. At 1310, the process 1300 establishes a parent-child relationship with the child cluster manager. In some embodiments, the process establishes this relationship by exchanging information with the child cluster manager to allow the two cluster managers to establish a communication tunnel to use for their communications (e.g., to exchange packets to pass desired state downstream (i.e., to pass commands downstream) and actual state upstream).

Next, at 1315, the process 1300 exchanges health monitoring messages with its child cluster manager(s). Health monitoring in some embodiments involves exchanging keep alive messages with the parent cluster manager. At 1320, the process determines whether it has detected failure of a connection with a child cluster manager. Such a failure in some embodiments can be due to the child cluster manager crashing (i.e., suffering an operation failure) or due to the failure of the connection link with the child cluster manager. If not, the process transitions to 1330, which will be described below.

When the process 1300 detects (at 1320) a failed connection to a child cluster manager, the process 1300 (at 1325) removes the child cluster manager from its lists of child cluster managers, identifies new upstream state data that removes the failed child cluster manager's state data, and sends the updated state data to its parent cluster manager (i.e., the parent cluster manager of the cluster manager that is performing the process 1300). From 1325, the process transitions to 1330.

At 1330, the process determines whether it has received a new request from a new cluster manager to establish parent-child cluster manager relationship. If so, the process returns to 1310 to establish parent-child relationship with the new cluster manager. Otherwise, the process determines (at 1335) whether it has received notification from a child cluster manager that the connection to one of its progeny cluster managers has failed. If not, the process 1300 returns to 1315 to continue its health monitoring operations.

When the process 1300 receives such a notification, the process 1300 (at 1340) updates its state data based on the state data received with the notification, and sends its updated state data to its parent cluster manager (i.e., the parent cluster manager of the cluster manager that is performing the process 1300). After 1340, the process returns to

1315 to continue its health monitoring operations. The process 1300 continues until it has removed its last child cluster manager, at which time it terminates.

Figure 14:
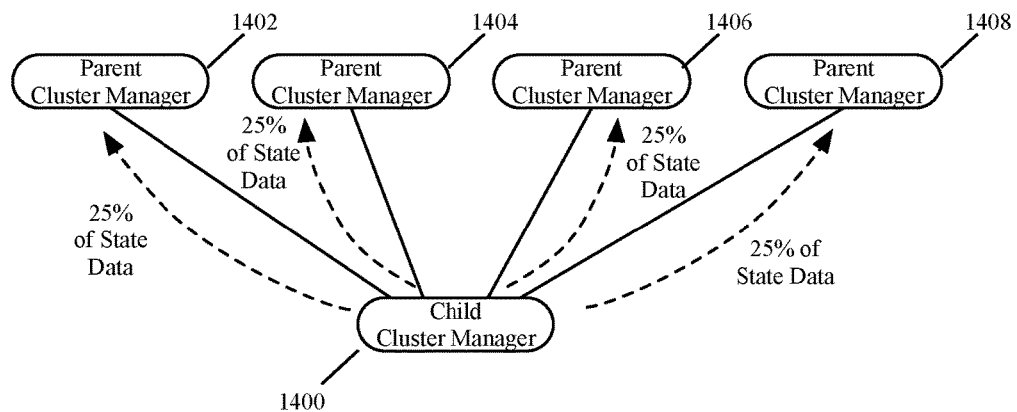
FIG. 14 illustrates an embodiment in which each cluster manager reports its X % of its data to each of N upstream cluster managers.

Other embodiments allow a cluster manager to connect to more than one upstream cluster manager and split the resources in some way between those cluster managers. For instance, FIG. 14 illustrates an embodiment in which each cluster manager reports its X % of its data to each of N upstream cluster managers. In this example, the cluster manager 1400 has four parent cluster managers 1402-1308 with each parent getting 25% of the state data of the cluster manager 1400. In some embodiments, different parent cluster managers 1402-1308 can receive different amounts of the state data from the cluster manager 1400.

In the example illustrated in FIG. 14, when one upstream CM fails or the connection between this CM and its child CM fails, only a fraction of the resources will be temporarily invisible to the upstream cluster managers. This HA approach is combined with the above-described HA process 1200 in some embodiments to allow a child CM to connect to another parent CM when its prior parent CM, or the connection to its prior parent CM, fails.

Some embodiments also employ novel processes to avoid loops in the management hierarchy. When any cluster manager connects to an upstream cluster manager that in turn, possibly over several connections, connects to itself, a loop is formed in the management hierarchy. Some or all of the cluster managers in the hierarchy in some embodiments are configured to detect such loops by detecting that the data that they collect increases without bounds.

Figure 15:
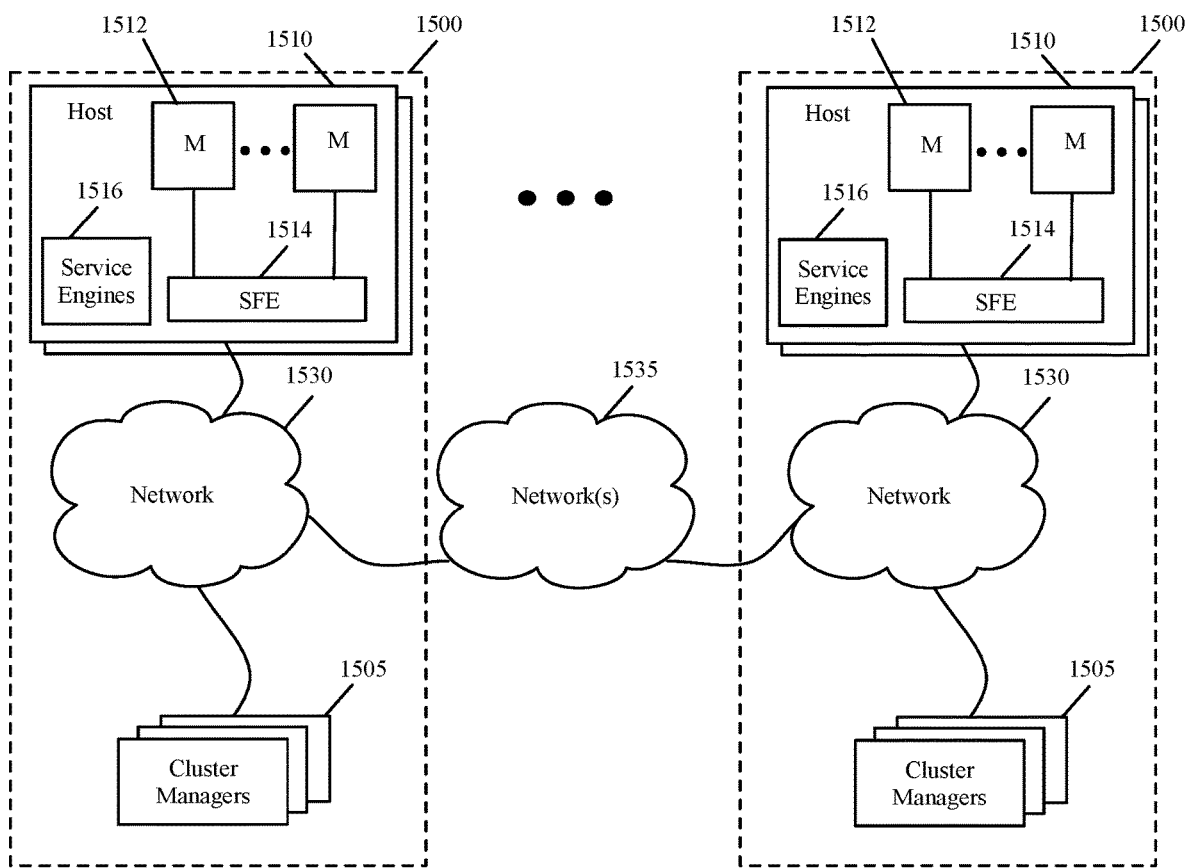
FIG. 15 illustrates examples of cluster managers and resource clusters in multiple datacenters.

FIG. 15 illustrates examples of cluster manager 1505 and resources in multiple datacenters 1500. The cluster managers 1505 in each datacenter 1500 are several servers that manage a variety of different clusters resources, such as host computers 1510, and machines (e.g., VMs, Pods, containers, etc.) 1512, software forwarding elements 1514 and service engines 1516, all executing on the host computer 1512. The cluster manager servers 1505 in some embodiments are machines that execute on host computers along with the machines 1512, while in other embodiments the severs 1505 execute on their own dedicated computers. Also, in other embodiments, the cluster managers 1505 manage other types of resource clusters, such as standalone forwarding elements (standalone routers, switches, gateways, etc.), middlebox service appliances, compute and network controllers and managers, etc.

As shown, in each datacenter 1500 the cluster managers 1505 communicate with the resource clusters (e.g., host clusters, machine clusters, SFE clusters, service engine clusters, etc.) through a datacenter network (e.g., a local area network) 1530. The datacenters are linked through one or more networks 1535 (e.g., Internet, or other private or public network). Through the network(s) 1535, one cluster manager in one datacenter can direct another cluster manager in another datacenter for downstream desired-state propagation or upstream realized-state propagation. Also, through each datacenter's network, one cluster manager in the datacenter can direct another cluster manager in the same datacenter for downstream desired-state propagation or upstream realized-state propagation.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 16 conceptually illustrates a computer system 1600 with which some embodiments of the invention are implemented. The computer system 1600 can be used to implement any of the above-described computers and servers. As such, it can be used to execute any of the above described processes. This computer system includes various types of non-transitory machine readable media and interfaces for various other types of machine readable media. Computer system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the computer system 1600. For instance, the bus 1605 communicatively connects the processing unit(s) 1610 with the read-only memory 1630, the system memory 1625, and the permanent storage device 1635.

From these various memory units, the processing unit(s) 1610 retrieve instructions to execute and data to process in order to execute the processes of the invention. The processing unit(s) may be a single processor or a multi-core processor in different embodiments. The read-only-memory (ROM) 1630 stores static data and instructions that are needed by the processing unit(s) 1610 and other modules of the computer system. The permanent storage device 1635, on the other hand, is a read-and-write memory device. This device is a non-volatile memory unit that stores instructions and data even when the computer system 1600 is off. Some embodiments of the invention use a mass-storage device (such as a magnetic or optical disk and its corresponding disk drive) as the permanent storage device 1635.

Other embodiments use a removable storage device (such as a flash drive, etc.) as the permanent storage device. Like the permanent storage device 1635, the system memory 1625 is a read-and-write memory device. However, unlike storage device 1635, the system memory is a volatile read-and-write memory, such a random access memory. The system memory stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select commands to the computer system. The input devices 1640 include alphanumeric keyboards and pointing devices (also called "cursor control devices"). The output devices 1645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples computer system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of computer system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of hierarchically managing resources arranged in a hierarchy in at least one datacenter, the method comprising:
    at a particular manager of a particular resource cluster:
        receiving a set of policies to implement state change from a parent cluster manager;
        after receiving the set of policies, separately receiving from the parent cluster manager a command and a set of policy-evaluating criteria, the command to implement a state change if the received set of policy-evaluating criteria satisfies a group of the received policies, wherein the set of policy-evaluating criteria comprises a predetermined threshold for available CPU cycles;
        determining that the received set of policy-evaluating criteria satisfies a group of one or more received policies; and
        based on said determination, implementing a state change in the particular resource cluster according to the command;
        wherein the particular manager is configured to switch to a secondary parent cluster manager in response to a failure of the parent cluster manager.

2. The method of claim 1 further comprising sending a report of the state change to the parent cluster manager.

3. The method of claim 1 further comprising:
    at the particular manager of the particular resource cluster:
        distributing the set of policies to at least one child manager of the particular manager, the child manager managing a resource cluster that is a child resource cluster of the particular resource cluster; and
        after distributing the set of policies to the child manager, separately distributing the received command and the set of policy-evaluating criteria to the child manager to use to evaluate against the distributed set of policies, in order to implement a state change on the child resource cluster according to the command based on an evaluation that the set of policy-evaluating criteria satisfy a subset of the distributed policies.

4. The method of claim 3 further comprising:
    receiving a report of the state change from the child cluster manager; and
    providing the report to the parent cluster manager.

5. The method of claim 1 further comprising:
    at the particular manager of the particular resource cluster:
        distributing the set of policies to each child manager of the particular manager, each child manager managing a different resource cluster that is a different child resource cluster of the particular resource cluster; and
        after distributing the set of policies to the child manager, separately distributing the received command and the set of policy-evaluating criteria to each child manager to use to evaluate against the distributed set of policies, in order to implement a state change on the child manager's resource cluster according to the command based on an evaluation that the set of policy-evaluating criteria satisfies a subset of the distributed policies.

6. The method of claim 1, wherein by receiving said policies, command and criteria enable the particular cluster manger to make the determination on its own as to whether the particular cluster manager needs to effectuate a state change on the particular resource cluster that it manages.

7. The method of claim 6, wherein said enablement freeing up ancestor cluster managers of the particular cluster manager from making the determination for the particular resource cluster managed by the particular cluster manager.

8. The method of claim 1, wherein the parent cluster manager received said policies, command and criteria from a cluster manager that is a parent of the cluster manager and a grandparent of the particular cluster manager.

9. The method of claim 1, wherein the resource clusters comprise compute clusters and network clusters.

10. The method of claim 9, wherein said managers are machines executing on the datacenter, said machines being one of containers, Pods, virtual machines and standalone computers.

11. A non-transitory machine readable medium storing a program for a particular manager of a particular resource cluster, the particular manage part of a hierarchical management system for managing resources arranged in a hierarchy in at least one datacenter, the program comprising sets of instructions for:
receiving a set of policies to implement state change from a parent cluster manager;
after receiving the set of policies, separately receiving from the parent cluster manager a command and a set of policy-evaluating criteria, the command to implement a state change if the received set of policy-evaluating criteria satisfies a group of the received policies, wherein the set of policy-evaluating criteria comprises a predetermined threshold for available CPU cycles;
determining that the received set of policy-evaluating criteria satisfies a group of one or more received policies; and
based on said determination, implementing a state change in the particular resource cluster according to the command;
wherein the particular manager is configured to switch to a secondary parent cluster manager in response to a failure of the parent cluster manager.

12. The non-transitory machine readable medium of claim 11,
wherein the program further comprising a set of instructions for sending a report of the state change to the parent cluster manager.

13. The non-transitory machine readable medium of claim 11, wherein the program further comprising a set of instructions for:
distributing the set of policies to at least one child manager of the particular manager, the child manager managing a resource cluster that is a child resource cluster of the particular resource cluster; and
after distributing the set of policies to the child manager, separately distributing the received command and the set of policy-evaluating criteria to the child manager to use to evaluate against the distributed set of policies, in order to implement a state change on the child resource cluster according to the command based on an evaluation that the set of policy-evaluating criteria satisfy a subset of the distributed policies.

14. The non-transitory machine readable medium of claim 13, wherein the program further comprising sets of instructions for:
receiving a report of the state change from the child cluster manager; and
providing the report to the parent cluster manager.

15. The non-transitory machine readable medium of claim 11, wherein the program further comprising sets of instructions for:
distributing the set of policies to each child manager of the particular manager, each child manager managing a different resource cluster that is a different child resource cluster of the particular resource cluster; and
after distributing the set of policies to the child manager, separately distributing the received command and the set of policy-evaluating criteria to each child manager to use to evaluate against the distributed set of policies, in order to implement a state change on the child manager's resource cluster according to the command based on an evaluation that the set of policy-evaluating criteria satisfies a subset of the distributed policies.

16. The non-transitory machine readable medium of claim 11, wherein by receiving said policies, command and criteria enable the particular cluster manger to make the determination on its own as to whether the particular cluster manager needs to effectuate a state change on the particular resource cluster that it manages.

17. The non-transitory machine readable medium of claim 16, wherein said enablement freeing up ancestor cluster managers of the particular cluster manager from making the determination for the particular resource cluster managed by the particular cluster manager.

18. The non-transitory machine readable medium of claim 11, wherein the parent cluster manager received said policies, command and criteria from a cluster manager that is a parent of the cluster manager and a grandparent of the particular cluster manager.

19. The non-transitory machine readable medium of claim 11, wherein the resource clusters comprise compute clusters and network clusters.

20. The non-transitory machine readable medium of claim 19, wherein said managers are machines executing on the datacenter, said machines being one of containers, Pods, virtual machines and standalone computers.

* * * * *